UNITED STATES PATENT OFFICE.

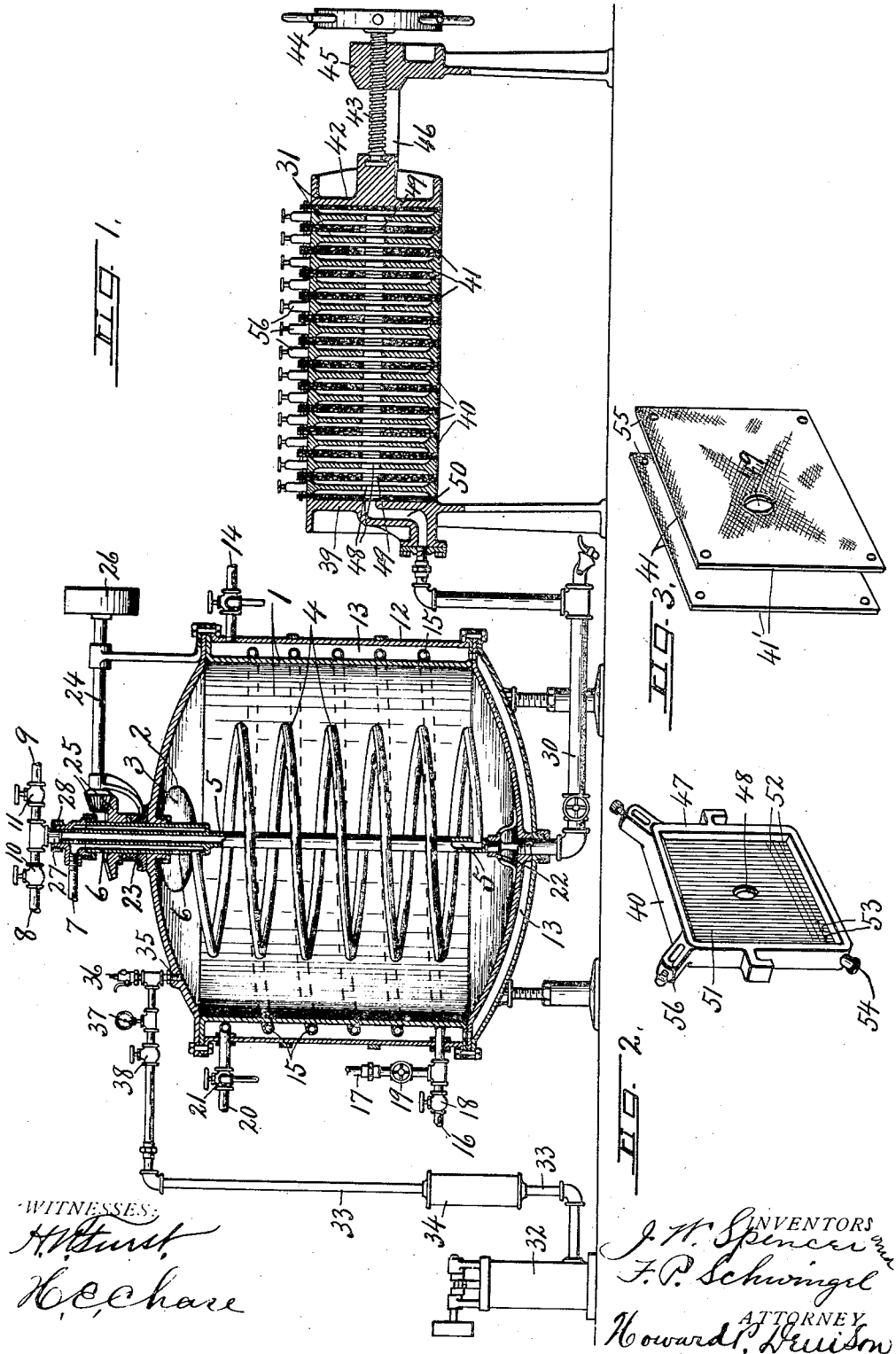

JOHN W. SPENCER AND FRANCIS P. SCHWINGEL, OF CHITTENANGO, NEW YORK.

PROCESS OF MAKING CHEESE.

1,159,808.  Specification of Letters Patent.  Patented Nov. 9, 1915.

Application filed April 8, 1913. Serial No. 759,661.

*To all whom it may concern:*

Be it known that we, JOHN W. SPENCER and FRANCIS P. SCHWINGEL, of Chittenango, in the county of Madison, in the State of New York, have invented new and useful Improvements in Processes of Making Cheese, of which the following, taken in connection with the accompanying drawings, is a full, clear, and exact description.

This invention relates to certain improvements in the method of manufacturing cheese and more particularly soft cheese which, under the present practice, requires separate machines or apparatus for pasteurizing and coagulating milk together with a large number of duplicate drainers and presses for removing the whey and excessive moisture, all of which necessitates an excessively large amount of room and repeated handling of the products in transferring or conveying them from one machine or apparatus to another so that the work is not only extremely laborious, expensive and time consuming, but is more or less unsanitary and results in unnecessary loss by waste in handling.

The main object is to perform the several operations of pasteurizing, coagulating and curdling the milk, seasoning or ripening the curd, and finally separating the cheese from the whey by successive but progressive stages without exposure or handling of any of the materials from the time of their introduction into the apparatus until the final production of the cheese. In other words, we have sought to provide a method of treating and handling the milk and its products in various stages of reduction within closed connected chambers of an apparatus having means whereby the passage of the material from one chamber to another may be controlled at will to allow proper periods of time for pasteurizing and coagulating the milk and for seasoning or ripening the curd and also for expressing the whey therefrom and permitting the finished product to be easily and quickly removed without undue loss of time or waste of materials.

Another object is to convey the products from the coagulating chamber to the whey-expressing chamber by purified air pressure.

Other objects and uses will be brought out in the following description.

In the drawings—Figure 1 is a longitudinal vertical sectional view, partly in elevation, of an apparatus for carrying out our process. Fig. 2 is a face view of one of the press plates showing the drainage ports therein. Fig. 3 is a perspective view of one of the screen partitions between the press plates.

The natural milk is introduced into an air and water-tight tank —1— through a suitable inlet —2— in the top thereof, after which the inlet is closed tightly by a lid —3— and suitable clamps not shown by which the lid may be held to its seat to form an air-tight joint. The temperature of the milk within the tank is then raised to an abnormal degree sufficient to destroy any injurious bacteria which may be present therein and also to sterilize the milk which is then subjected to an abnormal low temperature sufficient to chill it and thereby complete the destruction of any bacteria which may exist or develop in the liquid. This heating and chilling of the liquid is preferably accomplished by successively introducing steam and cold water through a spiral tube —4— which is disposed vertically within the tank and has its opposite ends connected respectively to a central upright tube —5— and an additional tube —6— surrounding the upper end of the central tube and provided with an outlet or overflow pipe —7— which may be connected to a condenser or waste receptacle (not shown).

The upper end of the central pipe is provided with branch inlets —8— and —9— having valves —10— and —11—, one of said branch pipes serving to admit steam to the central tube —5— and thence to the lower end of the coil —4— through which it passes upwardly into the base of the pipe —6— and thence outwardly through the outlet —7— during which time the cold water regulating valve —11— is closed. After the milk is subjected to this heat for the necessary period of time to bring the entire body of milk to the proper temperature, the steam-controlling valve —10— is closed and the cold-water controlling valve —11— opened to admit the cold water to the central pipe —5— and thence to the lower end of the coil —4— through which it passes upwardly through said coil into the pipe —6— and thence outwardly through the waste pipe —7—, the circulation of cold water continuing until the entire body of milk is thoroughly chilled. In order to expedite this heating and cooling of the liquid within the tank, we have provided the latter with an external jacket —12— forming an intervening chamber —13— which extends entirely around the upright sides and across the bottom of the tank for receiving and retaining a body of water, thereby forming a water jacket having an overflow or outlet —14— near its upper end to relieve the pressure by expansion of the water when heated in a manner presently described.

Encircling the tank —1— within the chamber —13— and therefore within the outer casing —12— is an additional pipe coil —15— having one end, as for example, its lower end provided with branch supply pipes —16— and —17— which are equipped with valves —18— and —19—, the upper end of the coil terminating in an outlet —20— having a valve —21—. The pipe —16— may be connected to any available source of steam supply (not shown) for supplying steam to the coil —15— through which it passes and escapes through the outlet —20—, during which operation the valve —19— is closed. The pipe —17— may be connected to any available source of cold water supply for admitting cold water to the coil —15— through which it passes and escapes through the outlet —20—, the valve —18— being closed when the water-supply valve is opened.

It is now clear that when it is desired to heat the milk within the tank, the cold water supply valves for both coils may be closed and the steam supply valves opened or, when it is desired to chill the milk within the tank, the steam supply valves may be closed and the cold water supply valves opened, thus alternately and successively heating and cooling the liquid within the tank, the expansion of the liquid in the water tank —13— being provided for by the overflow pipe —14— which prevents overstraining of the walls of the jacket. After the milk has thus been sterilized or pasteurized, a suitable quantity of rennet, acid or equivalent coagulating agent is added.

The entire body of milk and other ingredients are thoroughly agitated to assist and expedite coagulation of the milk and also to facilitate uniform heating and cooling of such body and for this purpose, the upright pipes —5— and —6— and coil —4— are caused to rotate and to serve as an agitator, the lower end of the central pipe —5— below the coil —4— being closed and stepped in a suitable bearing —22— centrally on the bottom of the tank while the upper end of the tubular conduit —6— above the upper end of the coil is journaled in a bearing —23— in the top of the tank and is driven by a driving shaft —24— through the medium of meshing gears —25—, the shaft —24— being provided with a pulley —26— which may be connected by a belt to any available source of power (not shown).

As previously intimated, the central pipe —5— extends through and above the pipe —6— and has a turning connection with a relatively stationary coaxial section —27— thereof through the medium of a stuffing box or gland —28— which prevents leakage at the joint.

After the coagulated milk has been treated in the manner described within the tank and the curd allowed sufficient time to season or ripen therein, it is expelled from the tank through a conduit —30— and into one end of a press —31— where the whey and moisture are expressed under such pressure, this air pressure being produced by an air compresser pump —32— by which atmospheric air is forced through the pipe —33— and filter —34— into the interior of the tank through an inlet —35— in the top thereof, said pipe being provided with a safety valve —36—, pressure gage —37— and controlling valve —38— to prevent over-pressure, to indicate the pressure and to open and close the air supply through the pipe at will.

The press preferably comprises a stationary head —39— and a series of press plates —40— and intervening screens —41— alternating with each other and adapted to be pressed together toward the stationary head —39— by a follower —42— and screw —43— having a hand wheel —44—, the screw being operated in a stationary threaded bearing —45— while the follower and press plates are held in operative position in registration with each other and guided upon suitable ways —46—.

The inner face of the head —39— and opposite faces of the plates —40— are chambered out to form recesses of relatively large area surrounded by marginal flanges —47— between which the screens —41— are impinged when the plates are pressed together to form air and water-tight joints, the assemblage of plates and screens constituting a succession of closed compartments intercommunicating through central apertures —48— and —49— in the plates —40— and screens —41— and coaxial with a central passage —50— in the stationary head —39— to which the pipe —30— is connected.

The central portions of each plate —40—, forming the back of the recesses and opposite faces thereof, are provided with a series of vertical channels —51— extending from top to bottom and intersected by cross channels —52— near the bottom thereof, the lower ends of some of the vertical channels communicating with one or more apertures —53— which lead to an outlet —54— in one corner of the plate, the object of these channels and apertures being to drain off the whey or moisture which may be expressed from the curd while under air pressure.

Each of the screens —41— preferably comprises two smaller rectangular pieces —41'— of sheets of canvas or other equivalent tough fabric stitched together around and in close proximity to their central apertures —48— leaving the remaining portions thereof separable for the purpose of wrapping the curd therein when removing it from the press, the corners of the fabric pieces —41'— being provided with eyelets —55— for receiving suitable fastening means (not shown) but by which the fabric pieces are clamped to slotted arms —56— on the corners of the plates —40—.

The press constitutes a confining medium for the curd while under air pressure and is preferably provided with a series of comparatively shallow intercommunicating compartments having suitable means for draining off the whey and moisture as it is expressed from the curd under such pressure, the elements of the press being separable at will to permit the removal of the curd when reduced to the proper consistency.

It will be seen from the foregoing description that the broad feature of our invention consists in successively pasteurizing and coagulating the milk and expressing the moisture and whey therefrom under air pressure within permanently connected closed chambers or conduits and that while we have shown and described the one form of apparatus for carrying out the objects of the invention, it is evident that the air compressor tank and press may be located in close proximity or at remote distances one from the other without breaking the closed connection between them.

What we claim is:

1. The process of making cheese consisting in coagulating the milk in a tank, forcing the coagulate milk from said tank by air pressure into a moisture-expressing compartment, and utilizing such air pressure to express the whey from the coagulated milk.

2. The process of making cheese consisting in coagulating the milk, producing an air pressure in the vessel containing the coagulated milk to force the coagulated milk through closed conduits into a moisture expressing compartment and expressing the whey.

3. The method of making cheese consisting in introducing coagulated milk into a moisture-expressing compartment formed of a series of intercommunicating chambers each provided with a drainage port and a screen diaphragm, exerting pressure upon the milk within the chambers of the expressing compartment whereby the solids are collected and the whey expressed and discharged separately from the collected solids.

In witness whereof we have hereunto set our hands this 4th day of April, 1913.

JOHN W. SPENCER.
FRANCIS P. SCHWINGEL.

Witnesses:
JOHN R. COSTELLO,
EKA M. ANTHONY.